United States Patent [19]

Turner

[11] 4,290,445
[45] Sep. 22, 1981

[54] VALVE PLATE

[75] Inventor: Larry G. Turner, Waterford, Mich.

[73] Assignee: Bristol Corporation, Elkhart, Ind.

[21] Appl. No.: 71,566

[22] Filed: Aug. 31, 1979

[51] Int. Cl.³ ............................................. F16K 11/20
[52] U.S. Cl. ........................................ 137/359; 4/192; 137/606; 137/801; 285/193
[58] Field of Search ..................... 4/191, 192; 137/359, 137/801, 606; 285/193

[56] References Cited

U.S. PATENT DOCUMENTS

| 3,010,474 | 11/1961 | Moen | 137/359 |
| 3,904,169 | 9/1975 | Cohn et al. | 251/223 X |
| 3,929,317 | 12/1975 | Cohn et al. | 251/223 |
| 4,084,607 | 4/1978 | Fagert et al. | 137/359 X |

FOREIGN PATENT DOCUMENTS

| 1368240 | 9/1974 | United Kingdom | 137/359 |
| 1384462 | 2/1975 | United Kingdom | 137/801 |
| 1486457 | 9/1977 | United Kingdom | 137/801 |

Primary Examiner—Gerald A. Michalsky
Attorney, Agent, or Firm—Oltsch, Knoblock & Hall

[57] ABSTRACT

A valve plate for attachment to a faucet assembly which interfits with the assembly to prevent the rotation and consequent breakage of the valve housings.

1 Claim, 4 Drawing Figures

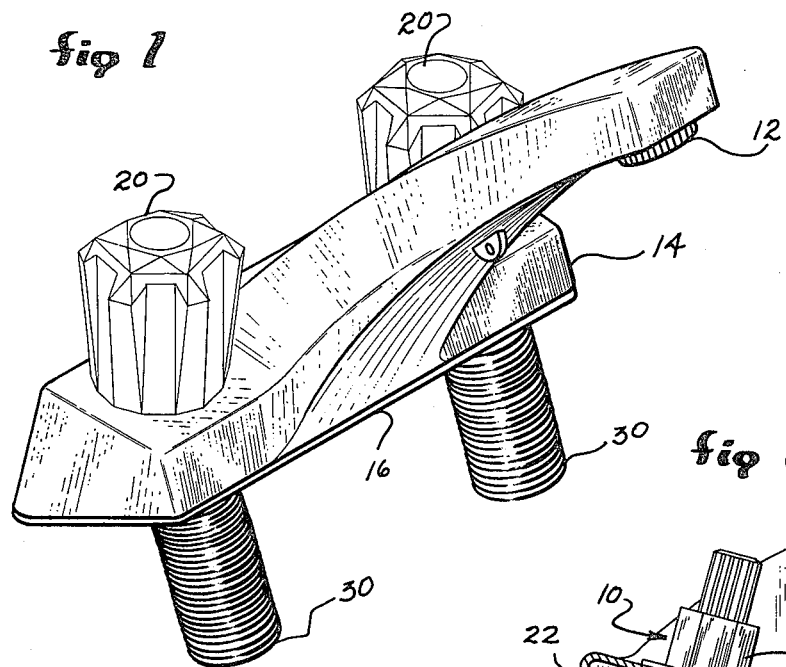
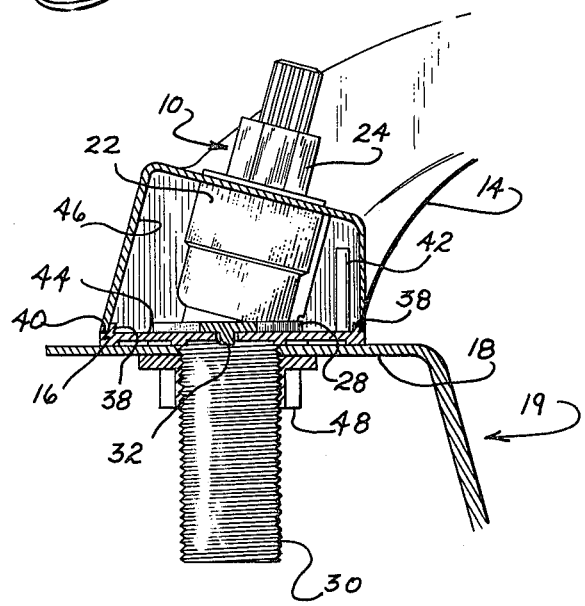
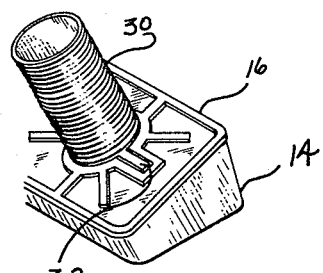
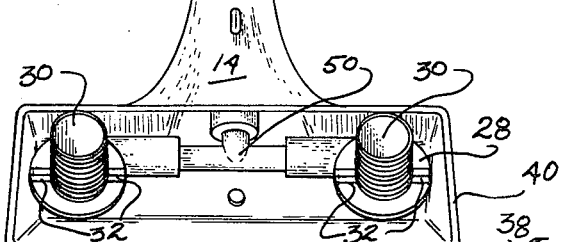
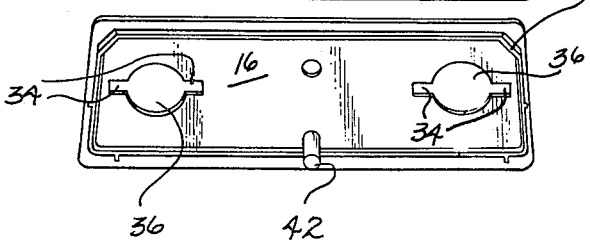

VALVE PLATE

SUMMARY OF THE INVENTION

This invention relates to a valve plate for a faucet assembly. This invention specifically relates to a valve plate to be used in conjunction with a faucet assembly as described in U.S. Pat. No. 3,929,317.

In attaching faucet assemblies to basins, sinks, and vanities, nuts are tightened upon threaded valve protrusions against the basin. If the nuts are over-tightened, the valve housings can be subjected to excessive stress and can turn along with the nut. In valve assemblies which are not constructed of metal, such as the molded plastic assembly described in the above mentioned patent, this turning of the valve housing can lead to fracturing of the valve.

The faucet assemblies have ribs molded into the mounting flanges of the threaded valve protrusions. These ribs fit into slots in the valve plate. In this manner, the valve housings are prevented from rotating relative to the valve plate. Additionally, the valve plate has a rib around its perimeter which interfits with the assembly cover plate. By interfitting with the cover plate, the valve plate is prevented from rotating relative to the cover plate, thereby eliminating a stress from being applied to the valve housing during attachment to the basin.

Accordingly, it is an object of this invention to provide a means for preventing the rotation of valve housings in a faucet assembly.

Another object of this invention is to protect valve assemblies from stress breakage.

Another object of this invention is to provide a valve plate for a valve assembly which interfits with the valve housings and cover plate.

A further object of this invention is to provide a valve plate which interlocks with the cover plate of a faucet assembly to prevent rotation of the valve plate.

Other objects will become obvious upon a reading of the following description.

BRIEF DESCRIPTION OF THE DRAWINGS

FIG. 1 is a perspective view of a faucet assembly in which this invention is utilized.

FIG. 2 is a cross sectional view of the component parts of the faucet assembly shown attached to a basin with the handles removed.

FIG. 3 is a fragmentary bottom plan view of the valve plate in place.

FIG. 4 is a bottom view showing the valve plate separated from the faucet assembly.

DESCRIPTION OF THE PREFERRED EMBODIMENT

The preferred embodiment illustrated is not intended to be exhaustive or to limit the invention to the precise form disclosed. It is chosen and described in order to best explain the principles and its application and practical use to thereby enable others skilled in the art to best utilize the invention.

The device shown in the figures represents a faucet assembly in which a pair of valves 10 are fluid coupled by a spout 12. The valves 10 and spout 12 are enclosed by a cover plate 14 which is connected to and rests upon a valve plate 16. In turn, valve plate 16 rests upon the horizontal flange 18 of basin 19. Handles 20 are connected to the valves 10 to enable the fluid flow to be regulated through the faucet and out spout 12.

The valves 10 utilized in this faucet assembly are similar to those described in U.S. Pat. No. 3,929,317, incorporated herein by reference, and illustrated in FIG. 2. Each valve 10 includes a housing having a body 22 which is preferably connected to cover plate 14. Body 22 includes a mounting flange 28 and a threaded protrusion 30 which in assembly projects through cover plate 14 to receive a nut 48. Mounting flange 28 carries one or more ribs 32 located radially about protrusion 30 and formed at the underside of the flange. Valve plate 16 is formed with an opening 36 for each valve. Each opening 36 has one or more slots 34 located in its periphery. Slots 34 receive ribs 32 when protrusion 30 of the valve body is fitted through plate opening 36 and the valve plate is positioned next to flange 28 of the body as best seen in FIG. 3.

Valve plate 16, also, includes a perimeter rib 38. Perimeter rib 38 is slightly inset from the outer edge of the internal surface 44 of valve plate 16. At the same time ribs 32 of each valve body are fitted into valve plate slots 34, perimeter rib 38 interfits within lower edge 40 of cover plate 14 as seen in FIG. 2.

An orientation peg 42 is located at the front of the internal surface 44 of valve plate 16. Peg 42 serves to prevent valve plate 16 from being positioned incorrectly. If valve plate 16 is positioned backwardly, peg 42 will strike the internal surface 46 of cover plate 14 to prevent the fit of the valve plate with the cover plate.

Without valve plate 16, the turning of nut 48 too tightly upon valve body protrusion 30 against basin 19 could cause rotation of the associated valve 10 and a resulting fracture or break in either the valve or T-joint 50. Valve plate 16 serves as a double-lock system to prevent valve rotation. Ribs 32 of the valve body flange 28 fit into slots 34 in the valve plate 16 to prohibit rotation of the valve without rotation of the valve plate. The interfit of perimeter rib 38 of valve plate 16 with the lower edge 40 of cover plate 14 prevents rotation of valve plate relative to the cover plate. Therefore, with valve plate 16 in proper position, extreme tightening of nut 48 will not cause valve rotation and possible subsequent breakage or leakage.

It is to be understood that the invention is not to be limited to the details above given but may be modified within the scope of the appended claims.

What I claim is:

1. In combination a valve plate, a basin having a first and second opening, a spout, first and second valve means for regulating the flow of liquid through said spout, each valve means including a threaded protrusion defining a liquid conduit into the valve means, each valve means protrusion carrying a mounting flange and extending through a said basin opening, nut means turned on each valve means protrusion for drawing the valve means into securement with said basin, said valve plate carried upon said basin about said basin openings, the improvement wherein each mounting flange carries a depending rib, said valve plate having first and second openings each with a slot in its periphery, each valve means protrusion fitting through a said valve plate opening with said slot therein receiving a flange rib to prevent rotation of the valve means relative to said valve plate.

* * * * *